US012752616B2

(12) United States Patent
Stubbs et al.

(10) Patent No.: US 12,752,616 B2
(45) Date of Patent: Oct. 6, 2026

(54) ELECTRIC TRANSMISSION WITH FRICTION CLUTCH DISENGAGEMENT DEVICE

(71) Applicant: Dana Automotive Systems Group, LLC, Maumee, OH (US)

(72) Inventors: Benjamin Stubbs, Warwickshire (GB); Pier Marco Fracchia, West Midlands (GB)

(73) Assignee: DANA AUTOMOTIVE SYSTEMS GROUP, LLC, Maumee, OH (US)

( * ) Notice: Subject to any disclaimer, the term of this patent is extended or adjusted under 35 U.S.C. 154(b) by 0 days.

(21) Appl. No.: 19/091,616

(22) Filed: Mar. 26, 2025

(65) Prior Publication Data

US 2026/0296174 A1 Oct. 1, 2026

(51) Int. Cl.

| | |
|---|---|
| ***F16D 25/08*** | (2006.01) |
| ***B60K 6/387*** | (2007.10) |
| ***F16D 25/062*** | (2006.01) |

(52) U.S. Cl.

CPC ............ *B60K 6/387* (2013.01); *F16D 25/062* (2013.01); *F16D 25/083* (2013.01)

(58) Field of Classification Search

CPC .......... B60K 6/00–6/547; B60K 17/00–17/36; F16D 3/089–091; F16D 25/14; F16D 2048/0257; F16D 2048/0263

See application file for complete search history.

(56) References Cited

U.S. PATENT DOCUMENTS

| | | | | |
|---|---|---|---|---|
| 2,578,715 A * | 12/1951 | Mason | .................. | F16D 27/115 192/40 |
| 7,803,085 B2 | 9/2010 | Himmelmann | | |
| 8,984,976 B2 | 3/2015 | Cavallino | | |
| 9,140,335 B2 | 9/2015 | Knoblauch | | |
| 9,933,049 B2 | 4/2018 | Kimes | | |
| 10,344,829 B2 | 7/2019 | Knoblauch et al. | | |

(Continued)

FOREIGN PATENT DOCUMENTS

| | | |
|---|---|---|
| DE | 4212324 A1 | 8/1992 |
| DE | 4305054 A1 | 8/1994 |

(Continued)

OTHER PUBLICATIONS

Hanlon, M., "New multi-speed Electric Vehicle transmission improves EV performance and range," New Atlas Website, Available Online at https://newatlas.com/new-multi-speed-electric-vehicle-transmission-improves-ev-performance-and-range/11670/, May 12, 2009, 10 pages.

*Primary Examiner* — Ernesto A Suarez
*Assistant Examiner* — Lillian T Nguyen
(74) *Attorney, Agent, or Firm* — McCoy Russell LLP

(57) ABSTRACT

Systems and methods for a transmission. The transmission system includes, in one example, a dog clutch that is configured to selectively engage a first freewheeling gear that meshes with a first gear. The transmission system further includes an electromechanically or hydraulically actuated friction clutch configured to selectively engage a second freewheeling gear that meshes with a second gear. The transmission system even further includes a friction clutch disengagement device configured to inhibit actuation of the electromechanically or hydraulically actuated friction clutch in response to overrun of the first freewheeling gear.

9 Claims, 7 Drawing Sheets

(56) References Cited

U.S. PATENT DOCUMENTS

| | | | |
|---|---|---|---|
| 11,124,064 B2 | 9/2021 | Kaltenbach et al. | |
| 11,280,391 B2 | 3/2022 | Engerman | |
| 11,346,429 B2 | 5/2022 | Mordukhovich et al. | |
| 11,358,468 B2 | 6/2022 | Wang et al. | |
| 11,384,817 B2 * | 7/2022 | Park | B60K 17/16 |
| 11,498,503 B2 | 11/2022 | Hirao et al. | |
| 2014/0033844 A1 | 2/2014 | Rothvoss et al. | |
| 2017/0175863 A1 | 6/2017 | Kramer et al. | |
| 2024/0068560 A1 | 2/2024 | Irato et al. | |

FOREIGN PATENT DOCUMENTS

| | | | |
|---|---|---|---|
| DE | 102005022926 B3 | 2/2007 | |
| DE | 102012015863 A1 | 5/2014 | |
| DE | 102013102161 A1 | 9/2014 | |
| DE | 102014101713 A1 | 8/2015 | |
| DE | 102015120818 A1 | 6/2017 | |
| DE | 102020206855 A1 | 12/2021 | |
| DE | 102015116537 B4 | 10/2022 | |
| DE | 102022202853 A1 * | 9/2023 | F16H 57/04 |
| EP | 3126172 B1 | 4/2020 | |

* cited by examiner

300

| | | Friction Clutch (122) | | |
|---|---|---|---|---|
| | | Open | Controlling | Closed |
| Dog Clutch (124) | Unlocked | Neutral (state i) | 2nd Gear (state iii) | |
| | Locked | 1st Gear & Reverse (state ii) | Gear shifting transients (state v) | Transmission Locked (State iv) |

FIG. 3

400

| State | Gear/Shift Event | Dog Clutch (124) | Friction Clutch (122) | Positive torque | Negative torque |
|---|---|---|---|---|---|
| ii | 1st Gear | Engaged | Open | Permitted | Permitted |
| iii | 2nd Gear | Disengaged | Closed | Permitted | Permitted |
| | 1st – 2nd Shift | | | | |
| v | Torque Phase {Disengage dog clutch} | Engaged | Controlling (increasing) | Permitted | Not Permitted |
| iii | Speed Phase | Disengaged | Controlling | Permitted | Permitted |
| | 2nd – 1st Shift | | | | |
| iii | Speed Phase {Engage dog clutch} | Disengaged | Controlling | Permitted | Permitted |
| v | Torque Phase | Engaged | Controlling (decreasing) | Permitted | Not Permitted |

FIG. 4

ELECTRIC TRANSMISSION WITH FRICTION CLUTCH DISENGAGEMENT DEVICE

TECHNICAL FIELD

The present disclosure relates to a transmission with a friction clutch disengagement device that inhibits engagement of the friction clutch when a gear receives overrun torque.

BACKGROUND AND SUMMARY

Certain electric powertrains have made use of multi-speed transmissions to increase powertrain adaptability and efficiency. Specifically, dual wet clutch transmissions have been used to increase shifting smoothness. Other transmissions have used a combination of a locking ring and a sprag clutch for first gear engagement.

The inventors have recognized several drawbacks with dual wet clutch transmissions as well as transmissions that use a selectively lockable one-way clutch for gear engagement. For instance, dual-clutch transmissions have a complex mechanical architecture and experience drag losses in both of the friction clutches and pumping losses for actuation systems for the clutches. Transmissions that make use of sprag clutches experience losses in the sprag clutch and may experience binding during certain operating conditions, which may cause component degradation. Further, in the sprag clutch architecture discussed above, during an upshifting transient, the locking ring needs to be disengaged prior to engaging the other clutch to avoid undesired deceleration and vehicle instability.

The inventors have recognized the aforementioned issues and developed a transmission system that includes, in one example, an engagement device that is configured to selectively engage a first freewheeling gear that engages with a first gear. The electric transmission system further includes an electromechanically or hydraulically actuated friction clutch that is configured to selectively engage a second freewheeling gear that engages a second gear. The electric transmission system even further includes a friction clutch disengagement device that is configured to inhibit actuation of the electromechanically or hydraulically actuated friction clutch in response to the application of overrun torque to the first freewheeling gear. In this way, a locked condition where both the friction clutch and the dog clutch are simultaneously engaged is avoided using a transmission with a less complex architecture than transmissions such as dual friction clutch transmissions. Further, drag losses are reduced in the transmission when compared to dual friction clutch transmissions and transmissions that use a selectively lockable one-way clutch.

In one example, the friction clutch may be hydraulically actuated and the friction clutch disengagement device is a dump valve that directs fluid away from a hydraulic actuator of the friction clutch in response to the application of overrun torque to the first gear. In such an example, the dump valve may be incorporated into an engagement hub of the engagement device or may be incorporated into an inner diameter of the first freewheeling gear. In this way, the dump valve is able to be space-efficiently incorporated into the system.

In another example, the friction clutch may be electromechanically actuated and the friction clutch disengagement device may be an electric switch that is configured to interrupt a control signal that is sent to an electronic actuator of the electromechanically actuated friction clutch to induce clutch disengagement. In this way, the friction clutch disengagement device can be incorporated into a transmission with electromechanical friction clutch actuation, thereby expanding the system's applicability.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE FIGURES

FIGS. 3-4 show charts that depict different operating states and shifting events in the transmission, depicted in FIG. 1.

DETAILED DESCRIPTION

A friction clutch disengagement device that is designed to be passively triggered (in response to the application of overrun torque to a driven gear during shifting) to prevent engagement of a friction clutch in a transmission. The friction clutch disengagement device may take the form of a hydraulic device (e.g., a dump valve) or an electromechanical device (e.g., an electric switch) based on the type of actuator that the friction clutch utilizes. In the hydraulic device embodiment, when the device is passively triggered via dog clutch overrun, hydraulic fluid is diverted away from a hydraulic actuator of the friction clutch whose level of engagement is dependent on the level of fluid pressure delivered thereto. In the electromechanical device embodiment, when the device is passively triggered in response to the application of overrun torque to the dog clutch, the electronic device interrupts (either via short circuiting or disconnecting a series electrical connection) electricity flow to an electromechanical actuator for the friction clutch.

Figure 1:
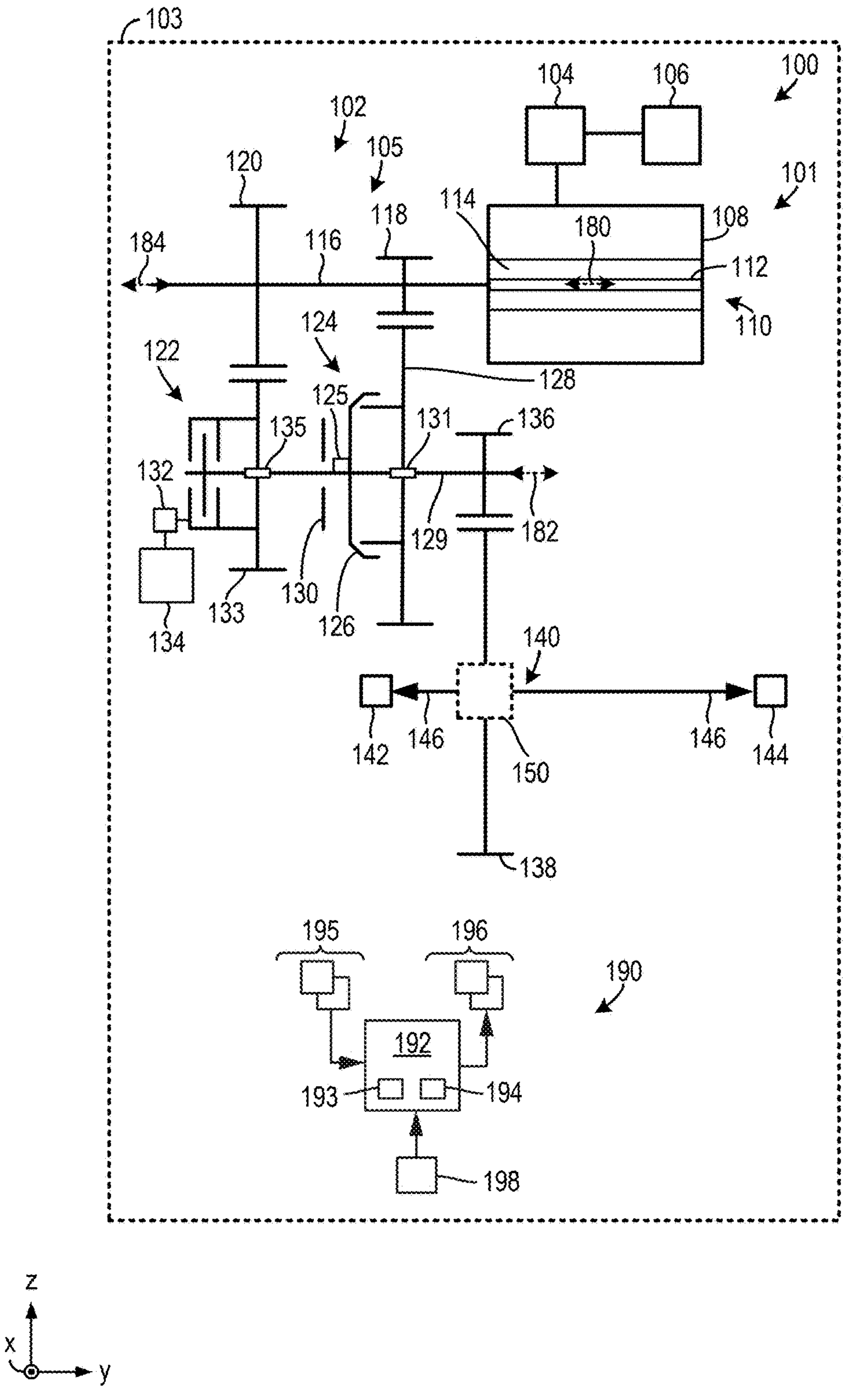
FIG. 1 shows a schematic depiction of an example of an electric powertrain with a transmission.

FIG. 1 shows an example of an electric powertrain 100 with an electric machine 101 and a transmission 102 and a transmission system 105 (e.g., two-speed transmission system). In such an example, the electric machine included in the electric drive may be a traction motor. The electric powertrain 100 is included in an electric vehicle 103 such as an all-electric vehicle or a hybrid electric vehicle (HEV). As such, in the HEV example, an internal combustion engine may be used in the powertrain. A variety of HEV architectures have been contemplated. Alternatively, in the all-electric powertrain example, the engine is omitted from the powertrain.

In the electric powertrain 100, an inverter 104 is electrically coupled to the electric machine 101. The inverter 104 may be electrically connected to an energy storage device 106 (e.g., one or more traction batteries, capacitor(s), fuel cell(s), combinations thereof, and the like). As such, electrical energy may flow between the inverter and the energy storage device during drive operation and regeneration operation, when the electric machine 101 is designed as a motor-generator.

The electric machine 101 includes a stator 108 and a rotor 110. The rotor 110 includes a rotor shaft 112 and a rotor core 114. The rotor shaft 112 is coupled to a shaft 116 (e.g., an input shaft) in the transmission 102 to enable torque transfer therebetween. This coupling may take the form of a splined interface, a welded interface, a flanged interface, combinations thereof, and the like.

In the illustrated example, a gear 118 (e.g., a first gear) and a gear 120 (e.g., a second gear) are mounted on the shaft 116 such that they rotate therewith. The gears 118 and 120 may be mounted on different shafts, as elaborated upon herein.

The transmission 102 further includes a friction clutch 122 and an engagement device 124 (e.g., a dog clutch). The engagement device 124 is formed as a splined coupling device that includes an engagement hub 126 that selectively engages a gear 128 that meshes with the gear 118. Specifically, engagement of the dog clutch causes splines in the clutch to mate such that mechanical power is transferred from the gear 128 to a shaft 129 (e.g., an intermediate shaft) via the dog clutch.

The gear 128 is rotationally mounted on the shaft 129 via a bearing 131. As such, the gear 128 may be referred to as a freewheeling gear. A shift fork 130 or other suitable actuator may be used to actuate the dog clutch 124. The dog clutch 124 is configured to move between an engaged state and a disengaged state (e.g., a neutral state). The engaged state occurs when the transmission is operated in a first gear mode and the disengaged state occurs when the transmission is operated in a second gear mode, or neutral. As discussed in greater detail herein, the dog clutch is switched between the engaged state and the disengaged state during shifting transients.

A friction clutch disengagement device 125 (which is schematically depicted in FIG. 1) is incorporated into the dog clutch 124. The friction clutch disengagement device 125 is configured to passively disengage the friction clutch 122. The friction clutch disengagement device may take the form of a hydraulic device or an electronic device depending on the type of actuation that the friction clutch employs. Examples of the friction clutch disengagement device are shown in FIGS. 5-9 and discussed in greater detail herein.

The friction clutch 122 is configured to be selectively engaged and disengaged. To elaborate, the friction clutch 122 may be operated in various stages of engagement, referred to as clutch slipping. Further, during engagement, the friction clutch 122 engages a freewheeling gear 133 such that mechanical power flows from the gear through the friction clutch and to the shaft 129.

An actuator 132 for the friction clutch 122 is schematically depicted in FIG. 1. Further, an actuation system 134 which may include a controller 192 (discussed in greater detail herein) may be used to operate the actuator 132. The actuator 132 may take the form of a hydraulic actuator or an electromechanical actuator, in different examples.

A freewheeling gear 133 is freely rotationally coupled to the shaft 129 (e.g., an intermediate shaft) when the friction clutch is disengaged. Therefore, a bearing 135 is used to mount the freewheeling gear 133 to the shaft 129. Similarly, as discussed above, the freewheeling gear 128 is freely rotationally coupled to the shaft 129.

In the illustrated example, the friction clutch 122 and the dog clutch 124 are positioned coaxial to the shaft 129. In such an example and when the friction clutch is hydraulically actuated, a hydraulic actuation line extends through the shaft 129 as discussed in greater detail with regard to FIGS. 5-8. In other examples, the friction clutch 122 and the dog clutch 124 may be positioned coaxial to different shafts. For instance, the friction clutch may be positioned coaxially to the shaft 116 and the dog clutch may be positioned coaxial to the shaft 129 or vice versa.

In the illustrated example, a gear 136 is coupled to the shaft 129 such that it rotates therewith. Further, the gear 136 meshes with a gear 138 that is coupled to a shaft 140 (e.g., an output shaft) such that it rotates therewith. The shaft 140 is coupled to downstream components 142 and 144 (e.g., one or more drive axles that may include differentials, axle shafts (e.g., half shafts), and drive wheels) as denoted via arrows 146. Specifically in one example, the gear 138 may be a ring gear in an axle differential 150. The axle differential 150 may therefore be coupled to the drive wheels via axle shafts (e.g., half shafts). In such an example, the downstream components 142 and 144 are drive wheels. In another example, the gear 138 may be included in an inter-axle differential.

The electric powertrain 100 may further include a control system 190 with a controller 192 as shown in FIG. 1. The controller 192 may include a microcomputer with components such as a processor 193 (e.g., a microprocessor unit), input/output ports, an electronic storage medium 194 for executable programs and calibration values (e.g., a read-only memory chip, random access memory, keep alive memory, a data bus, and the like). The storage medium may be programmed with computer readable data that represents instructions that are executable by a processor for performing the methods and control techniques described herein as well as other variants that are anticipated but not specifically listed. As such, control techniques, methods, and the like expanded upon herein may be stored as instructions in non-transitory memory.

The controller 192 may receive various signals from sensors 195 coupled to various regions of the electric powertrain 100. For example, the sensors 195 may include an electric machine speed sensor, a stator current sensor, an electric machine temperature sensor, a battery state of charge sensor, an inverter current sensor, clutch position sensors, and the like. Electric machine speed may be ascertained from the amount of power sent from the inverter 104 to the electric machine 101. An input device 198 (e.g., an accelerator pedal, a brake pedal, a drive mode selector, a gear selector, combinations thereof, and the like) may further provide input signals indicative of an operator's intent for electric powertrain control.

Although, one controller is depicted in FIG. 1, it will be understood that the electric powertrain and the system in which it is incorporated, such as a vehicle, may include multiple controllers. For instance, in the EV example, a vehicle control unit (VCU) may be included in the control system 190. Additionally, a transmission control unit (TCU) and a motor control unit (MCU) may be included in the control system. In such an example, the VCU, the MCU, and the TCU may be distinct controllers with independent hardware and may be formed in separate enclosures which are spaced away from one another. However, in other examples, the VCU, the TCU, and the MCU may be collocated. In either case, the VCU, the TCU, and the MCU are in electronic communication with one another.

Upon receiving the signals from the various sensors 195 of FIG. 1, the controller 192 processes the received signals, and employs various actuators 196 of the electric powertrain components to adjust the components based on the received signals and instructions stored on the memory of controller 192. For example, the controller 192 may receive a signal indicative of an operator's request for increased electric machine output. In response, the controller 192 may command operation of the inverter 104 to adjust the electric machine's mechanical power output and increase the power delivered from the electric machine 101 to the transmission 102. The other controllable components in the electric drive may function in a similar manner in relation to sensor inputs and command outputs. For instance, the friction clutch 122 and the dog clutch 124 may be engaged and disengaged via control commands.

An axis system is provided in FIG. 1 as well as FIGS. 2A-2B, and 5-9 for reference, when appropriate. The z-axis may be a vertical axis (e.g., parallel to a gravitational axis), the y-axis may be a lateral axis (e.g., horizontal axis), and the x-axis may be a longitudinal axis, in one example. However, in other examples, the axes may have other orientations. Further, a rotational axis 180 of the electric machine 101 is provided in FIG. 1 for reference. Further, a rotational axis 182 of the shaft 129 and a rotational axis 184 of the shaft 116 are further provided in FIG. 1 for reference.

Figure 2A:
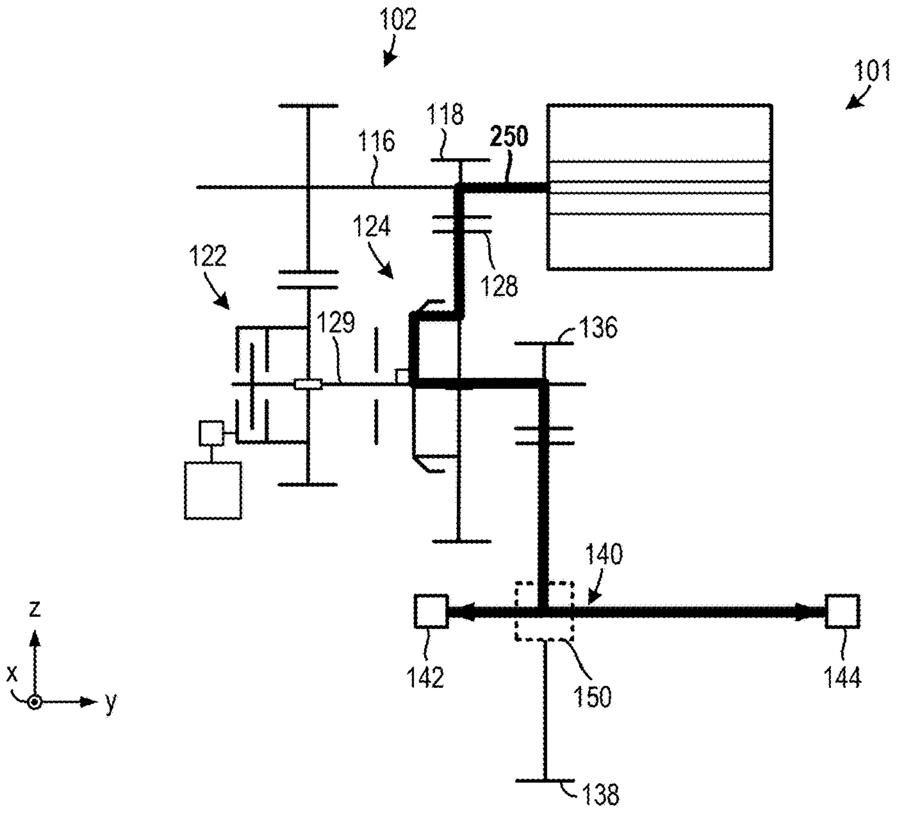
FIGS. 2A-2B show mechanical power paths in the transmission, depicted in FIG. 1, in a first gear mode and a second gear mode, respectively.
Figure 2B:
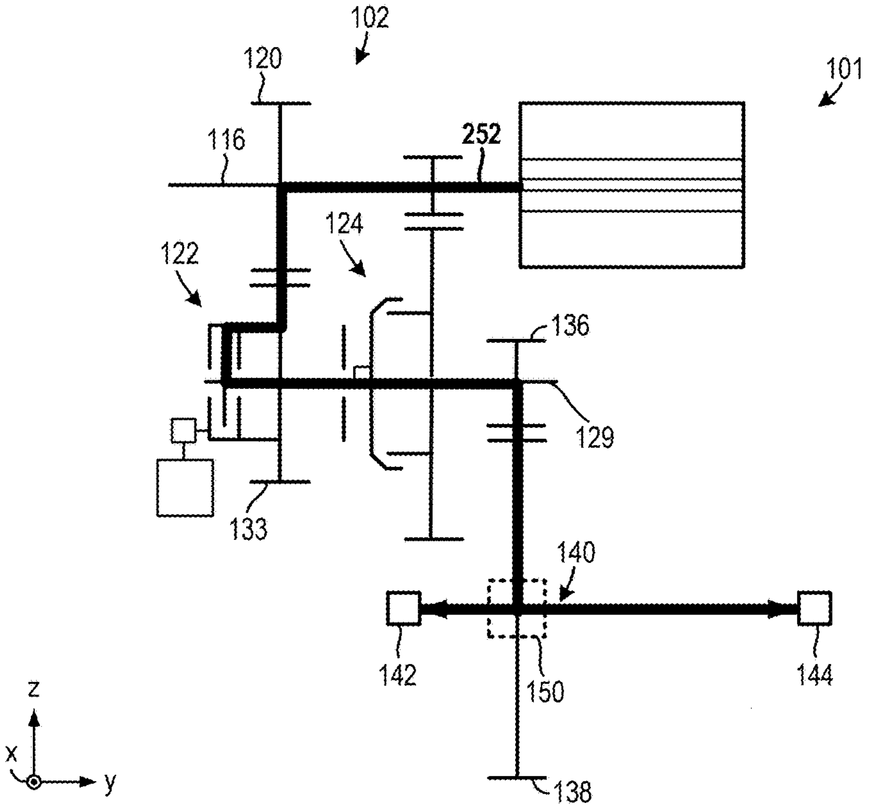

FIGS. 2A-2B show mechanical power paths 250 and 252 through the transmission 102 in a first gear mode and a second gear mode. In the first gear mode, the dog clutch 124 is engaged and the friction clutch 122 is disengaged. Conversely, in the second gear mode the dog clutch 124 is disengaged and the friction clutch 122 is engaged. In both the first and second gear modes, mechanical power travels from the electric machine 101 to the input shaft 116.

In the power path 250, shown in FIG. 2A, power travels from the shaft 116 to the gear 118, from the gear 118 to the freewheeling gear 128, from the freewheeling gear 128 to the shaft 129 via the dog clutch 124, from the shaft 129 to the gear 136, from the gear 136 to the gear 138, and from the gear 138 to the shaft 140 via the component 150 (e.g., an axle differential or an inter-axle differential) and then to downstream components 142 and 144.

In the power path 252, shown in FIG. 2B, power travels from the shaft 116 to the gear 120, from the gear 120 to the freewheeling gear 133, from the freewheeling gear 133 to the shaft 129 via the friction clutch 122, from the shaft 129 to the gear 136, from the gear 136 to the gear 138, and from the gear 138 to the shaft 140 via the component 150 (e.g., an axle differential or an inter-axle differential) and then to downstream components 142 and 144.

FIGS. 3-4 show charts 300 and 400, respectively, that depict different operating modes for the electric transmission described above with regard to FIGS. 1-2B. It will be understood that the charts may correspond to transmissions with alternate architectures such as architectures where the dog clutch and the friction clutch are positioned on opposing shafts (e.g., a driven shaft and a driving shaft or vice versa).

Specifically, the chart 300 depicted in FIG. 3 indicates different operating states (i.e., states i-v) that the transmission may be placed in via operation of the control system and the controllable components. The states i-v have clutch states associated therewith. Specifically, the following states of the friction clutch 122 are indicated in chart 300: open; controlling; and closed. The open state of the friction clutch corresponds to a clutch state where the clutch plates are disengaged such that torque transfer through the clutch is inhibited. In the controlling state, the clutch plates are transferring a varying amount mechanical power through the clutch, via clutch slipping. As elaborated upon herein with regard to FIG. 4, the friction clutch may be operated in the controlling state during a speed control and a torque control phase during shifting transients.

The following states of the dog clutch are indicated in chart 300: locked; and unlocked. In a locked state, mechanical power can be transferred through the dog clutch and in an unlocked state mechanical power transfer through the dog clutch is inhibited.

State i is a neutral mode where the friction clutch is open and the dog clutch is unlocked such that mechanical power transfer through the electric transmission is inhibited. State ii is a first gear mode (forward and reverse) where the dog clutch is locked and the friction clutch is open. Thus, in the first gear the traction motor may be spun in both directions such that the EV travels in a forward direction or a reverse direction.

State iii is a second gear mode where the friction clutch is in a closed or controlling state and the dog clutch is unlocked. State iv corresponds to a state where the friction clutch is closed and the dog clutch is locked to place the electric transmission in a locked state. As elaborated upon herein, state iv is passively avoided during vehicle movement via the friction clutch disengagement device which may take the form of a hydraulic device or an electronic device depending on the type of actuator used in the friction clutch. In this way, component degradation and undesirable vehicle deceleration and instability may be avoided. State v is a state that occurs during shifting transients where the dog clutch is in a locked state and the friction clutch is operated in a controlling state. Specifically, state v occurs during a torque control phase of a shift event, as expanded upon in greater detail herein.

FIG. 4 shows the chart 400 which correlates the states i-iv with gear modes (i.e., first gear and second gear), shifting events, the state of the dog clutch 124, the state of the friction clutch 122, positive torque authorization, and negative torque authorization.

As shown, in state ii, the dog clutch is locked, the friction clutch is open, and positive torque and negative torque are permitted. Further in state iii, the dog clutch is unlocked, the friction clutch is closed, and positive torque and negative torque are permitted.

In the shift event from the first gear to the second gear, a torque control phase and a speed control phase are sequentially implemented. Initially, during the torque control phase, the dog clutch is engaged and at the end of the torque control phase the dog clutch is disengaged. Further, during the torque control phase the friction clutch is operated in a controlling state where clutch torque increases. In the torque control phase, positive torque is permitted and negative torque is not permitted. Next during the speed control phase, the friction clutch is operated in a controlling state and the disengagement of the dog clutch is sustained. In the speed control phase, the clutch slip is reduced to zero and positive torque is permitted and negative torque is permitted.

In the shift event from the second gear to the first gear, a speed control phase and a torque control phase are sequentially implemented. Initially, during the speed control phase, the dog clutch is initially disengaged and then at the end of the speed control phase the dog clutch is engaged. Further, during the speed control phase, the friction clutch is operated in a controlling state. In the speed control phase, positive torque is permitted and negative torque is permitted. In the torque control phase, dog clutch engagement is sustained and the friction clutch is operated in a controlling state where clutch torque decreases. In the torque control phase, positive torque is permitted and negative torque is not permitted. For the avoidance of negative torque in both torque control phases during the upshifting and downshifting events, the friction clutch disengagement device is incorporated to the transmission and specifically the dog clutch to passively avoid the locked condition of the transmission which may degrade components, cause unwanted deceleration and vehicle instability.

FIGS. 5-8 show different examples of the friction clutch disengagement device that may be included in the transmission discussed above with regard to FIGS. 1-4 or other suitable transmissions or combinations of transmissions.

Figure 5:
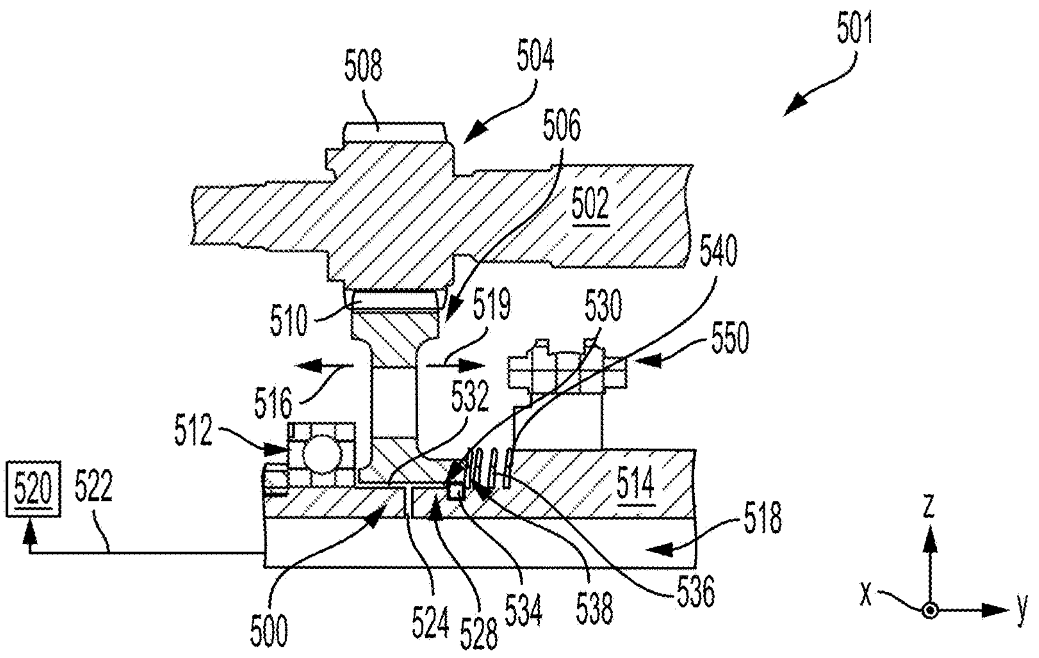
FIGS. 5-6 show an example of a hydraulic embodiment of a friction clutch disengagement device.
Figure 6:
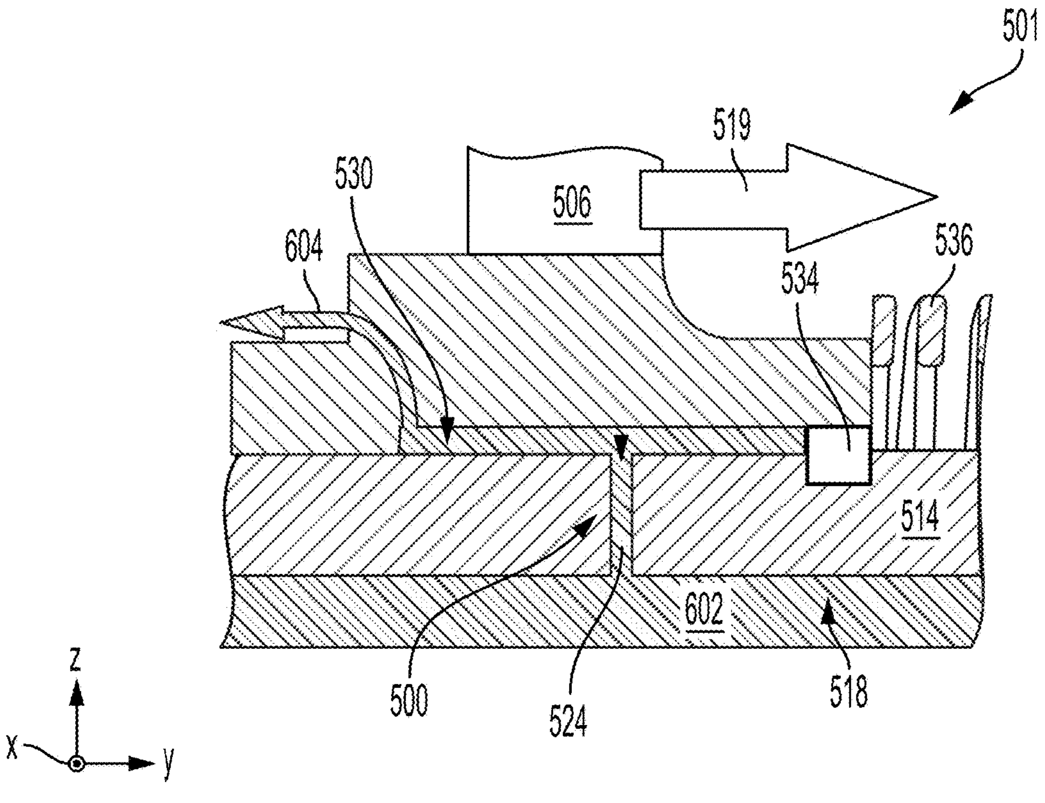

FIGS. 5-6 show an example of a friction clutch disengagement device where the device is a dump valve 500. The dump valve 500 is included in a transmission system 501. In the example depicted in FIGS. 5-6, the dump valve 500 is axially actuated and the friction clutch in the transmission is hydraulically actuated.

FIG. 5 shows a shaft 502 (e.g., an input shaft) that is coupled to an electric machine and a gear 504 (e.g., a first gear) mounted thereon or formed therewith. The gear 504 meshes with a freewheeling gear 506 that can be selectively coupled to shaft 514 via dog clutch 550. Both of the gears 504 and 506 are helical gears with helical teeth 508 and 510 that mesh with one another.

Due to the helical cut of the gears 504 and 506, the freewheel gear is moved in different axial direction depending the direction of torque transmitted through the gear. To elaborate, when the freewheeling gear 506 is driven by the gear 504 (e.g., the first gear), the freewheeling gear thrust direction is as shown by 516. Conversely, when the freewheeling gear 506 is overrun, the gear is thrust in direction 519, against spring 536.

The shaft 514 includes a hydraulic conduit 518 that extends through the interior of the shaft. The hydraulic conduit 518 is hydraulically coupled to an actuator 520 of the friction clutch (which is schematically depicted in FIG. 5). Arrow 522 denotes the hydraulic connection between the conduit 518 and the hydraulic actuator 520.

In the illustrated example, the dump valve 500 includes a dump valve conduit 524 that extends outward (e.g., radially outward) from the hydraulic conduit 518. The dump valve 500 further includes a seal 534, or other suitable mechanism that prevents oil flow moving in the direction of the spring 536. A bearing (e.g., a needle roller bearing) may allow relative rotation of the freewheeling gear 506 on the shaft 514, that also allows oil to flow in direction 516. In the illustrated example, a gap 530 is formed between the interior side 528 of the dog clutch gear 506 and an outer surface 532 of the shaft 514.

A spring 536 is positioned between an axial side 538 of the freewheeling gear 506 and a step 540 in the shaft 514. A dog clutch hub 550 is further depicted in FIG. 5. The dog clutch hub includes splines that are configured to selectively mate with splines in the freewheeling gear 506 when the dog clutch is engaged, in the illustrated example.

As shown in FIG. 6, the freewheeling gear 506 is moved in the direction 519 such that the gap between gear 506 and shoulder of a bearing 512 opens, in this way, fluid 602 is directed away, as indicated via arrow 604, from the friction clutch's hydraulic actuator to inhibit engagement of the friction clutch in response to overrun of gear 506 when the dog clutch is locked. The working fluid in the system may be oil or another suitable fluid. FIG. 6 further shows the seal 534 and the spring 536.

Figure 7:
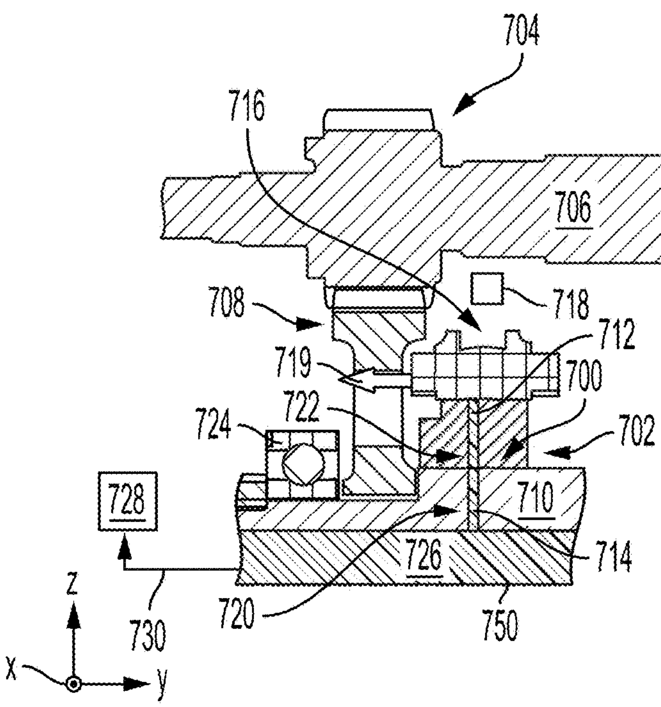
FIGS. 7-8 show another example of a hydraulic embodiment of a friction clutch disengagement device.
Figure 8:
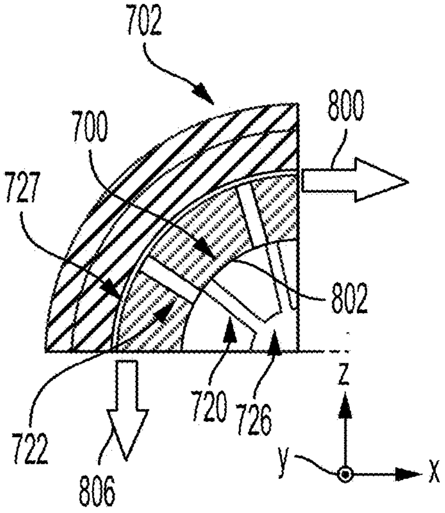

FIGS. 7-8 show another example of a friction clutch disengagement device where the device takes the form of a rotationally actuated dump valve 700 that is incorporated into a dog clutch hub 702 in an electric transmission system 703. A gear 704 that is mounted on a shaft 706 (e.g., an input shaft) and meshes with a freewheeling gear 708 as well as a shaft 710 (e.g., intermediate shaft) are again depicted in FIG. 7.

The dog clutch hub 702 includes a dump valve conduit 712 that extends outward (e.g., radially outward) therethrough. The shaft 710 further includes another dump valve conduit 714. A shift fork groove 716 is positioned on an outer portion of the dog clutch hub 702. The groove 716 interface with a shift fork 718 that is schematically depicted in FIG. 7. However, other suitable dog clutch actuators have been contemplated. The dog clutch hub 702 moves in axial direction 719 during engagement. The other dog clutch hubs described herein may include a similar shift fork groove. However, a variety of dog clutch actuation architectures have been contemplated.

The dump valve conduits 712 and 714 may be included in dump valve conduit sets 720 and 722. The conduits in the sets may be arranged (e.g., symmetrically arranged) about the central axis 750 of the clutch hub 702. The dump valve conduits 712 and 714 are aligned in the actuated configuration of the dump valve 700, shown in FIG. 7, such that the hydraulic fluid in the conduit 726 flows through the dump valve conduits 712 and 714 and empties into a gap 727 (shown in FIG. 8) in the dog clutch hub 702. It will be understood, that the dump valve 700 is actuated when the dog clutch is overrun, thereby avoiding simultaneous engagement of the friction clutch and the dog clutch.

A bearing 724 that is coupled to the shaft 710 and the freewheeling gear 708 is again depicted in FIG. 7. Further, a hydraulic conduit 726 is routed through the shaft 710 and in fluidic communication with a friction clutch actuation 728 (which is schematically depicted in FIG. 7) as indicated via arrow 730.

FIG. 8 shows the dump valve 700 where the dump valve conduit sets 720 and 722 are not aligned. Arrow 800 indicates the direction of rotation of the clutch hub 702 when the clutch hub is overrun. Rotating the clutch hub 702 in the overrun direction 800 therefore moves the dump valve conduit sets 720 and 722 into alignment such that an inner surface 802 of the hub 702 allows fluid flow through the dump valve conduit set 720 and the gap 727 in the clutch hub 702. On the other hand, when the clutch hub 702 is rotated in the drive direction 806, the dump valve conduit sets 720 and 722 are misaligned such that fluid is blocked between the dump valve conduit sets as previously indicated.

Figure 9:
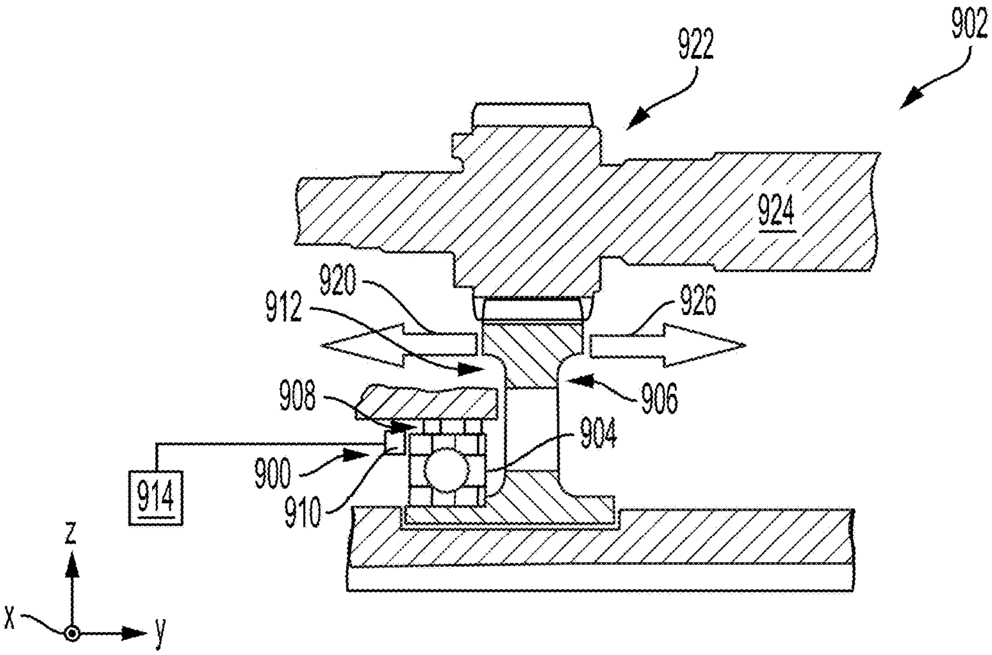
FIG. 9 shows an example of an electromechanical embodiment of a friction clutch disengagement device.

FIG. 9 shows another example of the friction clutch disengagement device where the device takes the form of an electric switch 900 in an electric transmission system 902. A bearing 904 is coupled to a freewheeling gear 906. The bearing 904 is configured to move axially with the gear 906, thereby completing an electric circuit on the static part of the transmission. Friction rings 908 allow the axial position of the bearing 904 to be controlled. The axial position of the freewheeling gear 906 again changes depending on whether the gear is driven or overrun. In the driven direction, a contact 910 of the electric switch 900 that is positioned on a drive side 912 of the gear 906 and the bearing 904 is pulled low, thereby completing the friction clutch's electronic actuator circuit 914 that is schematically illustrated in FIG.

9. The electronic actuator of the friction clutch may specifically be an electric motor. Arrow 920 depicts the axial direction of the gear 906 when the gear is driven via a gear 922 that is mounted on or otherwise incorporated into a shaft 924 (e.g., an input shaft). Conversely, arrow 926 indicates the axial direction of the gear 906 during overrun.

More generally, the electromechanical actuator for the friction clutch may be normally open. The electric switch 900 may be either electrically connected in series with the actuator circuit 914 or function to short circuit the electromechanical actuator (when the dog clutch is overrun), thereby blowing a fuse in the actuation circuit. In either, electric switch configuration, power removal from the friction clutch actuator prevents double engagement of the clutches in the transmission, independent of the software control scheme for the transmission.

Figure 10:
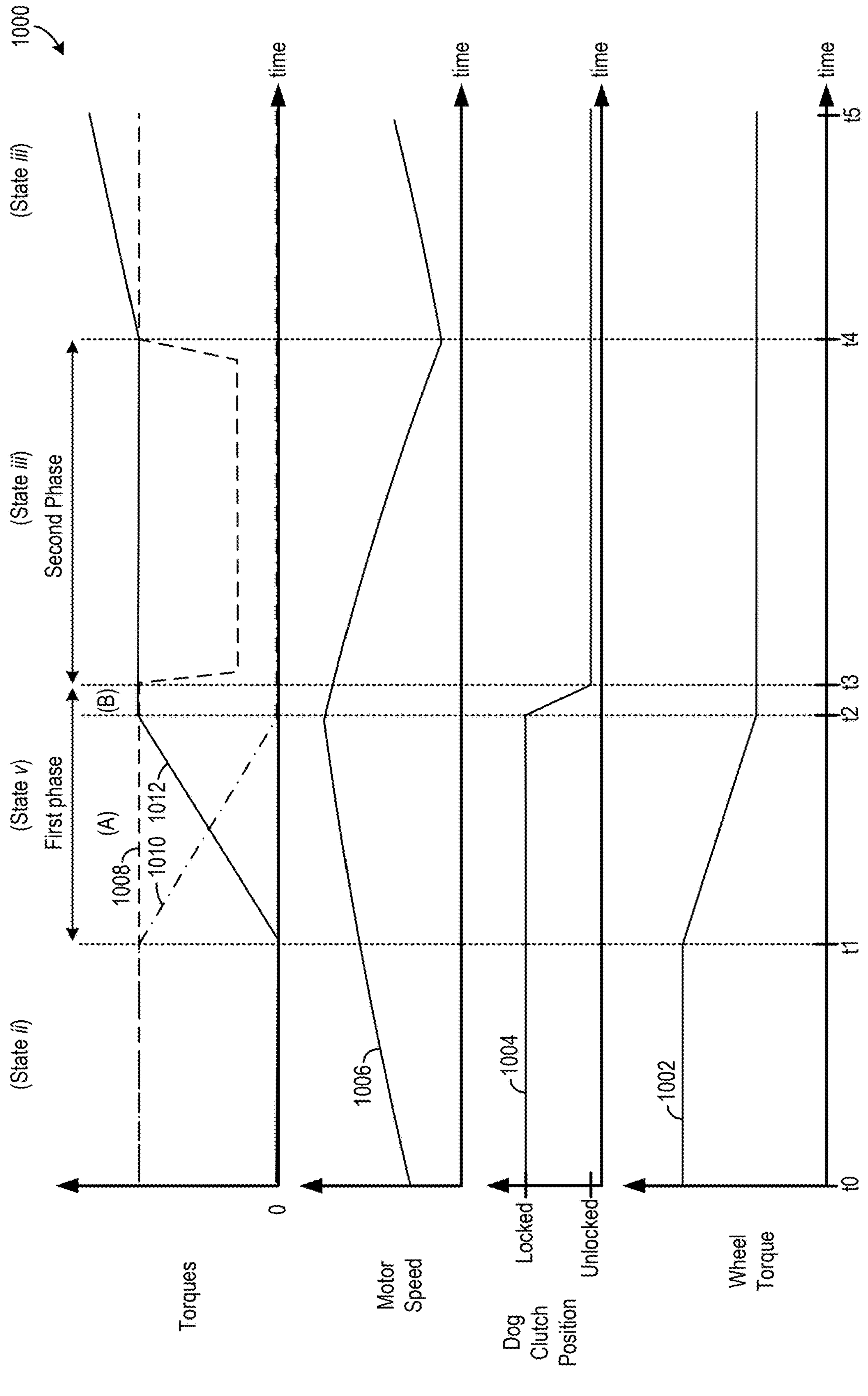
FIGS. 10-11 show timing diagrams during upshift and downshift events, respectively.
Figure 11:
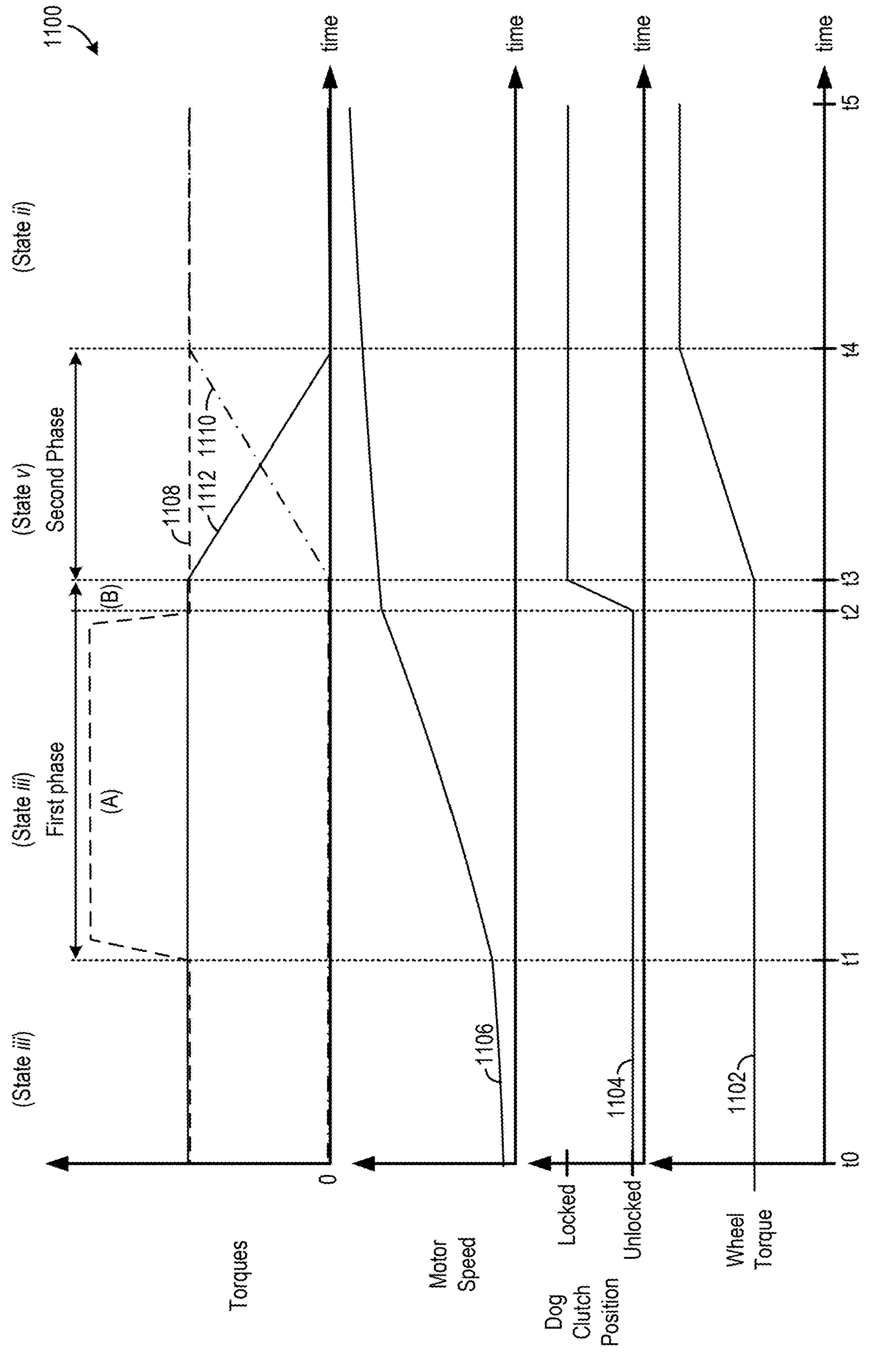

FIGS. 10-11 show prophetic timing diagrams 1000 and 1100 of transmission operating techniques for upshifting and downshifting, respectively. These shifting techniques may be implemented in any of the electric transmission systems described herein or combinations of the electric transmission systems. In each graph, time is indicated on the abscissa and increases from left to right, although specific numerical values are not indicated.

As depicted in FIG. 10, times t0, t1, t2, t3, t4, and t5 are specifically provided on the abscissa to delineate between the different phases of the upshift. Further, states (ii, v, and iii), delineated with regard to FIG. 3, are indicated in the timing diagram 1000 depicted in FIG. 10. Further, the upshift is conceptually divided into an initial condition from t0 to t1, a first phase (referred to as a torque phase) from t1-t3 with a sub-phase (A) from t1-t2 and a sub-phase (B) from t2-t3, a second phase (referred to as a speed phase) from t3 to t4, and a final condition from t4 to t5.

The ordinate for plot 1002 indicates wheel torque that increases from bottom to top, although specific numerical values are not indicated. The ordinate for plot 1004 indicates a position of the dog clutch (i.e., “Locked” and “Unlocked”). The ordinate for plot 1006 indicates traction motor speed that increases from bottom to top, although specific numerical values are not indicated. The ordinate for plots 1008, 1010, and 1012 indicates torques corresponding to the traction motor, the dog clutch, and the friction clutch, respectively. The torques generally increase from bottom to top, although specific numerical values are not indicated aside from a zero value.

From t0 to t1, the electric transmission is in state ii (i.e., the first gear state). Thus, the initial condition of the upshift is a condition where the first gear is engaged via the dog clutch and the friction clutch is open. In a first phase from t1 to t2, specifically referred to as a torque phase, torque is handed over from the dog clutch to the friction clutch. Specifically, in sub-phase (A) friction clutch torque is decreased as dog clutch torque is increased, thereby transferring the torque from the dog clutch to the friction clutch. As such, wheel torque decreases during sub-phase (A). Next during sub-phase (B) the dog clutch transitions from a locked state to an unlocked state. Further, motor torque is held constant during the first phase.

During the second phase, traction motor torque is temporarily reduced to allow the slip speed across the friction clutch to reduce to zero. Next from t4 to t5 the friction clutch may be controlled via micro-slip or may be set to a default fully clamped state. It will be appreciated that there is no motor torque compensation in the upshifting strategy depicted in FIG. 10.

FIG. 11 shows a timing diagram 1100 for a downshift event. As depicted in FIG. 11, times t0, t1, t2, t3, t4, and t5 are specifically provided on the abscissa to delineate between the different phases of the upshift. Further, states (iii, v, and ii), delineated with regard to FIG. 3, are indicated in the timing diagram 1100 depicted in FIG. 11. Further, the downshift is conceptually divided into an initial condition from t0 to t1, a first phase (referred to as a speed phase) from t1-t2, a second phase (referred to as a torque phase) from t2 to t4 with a sub-phase (A) from t2-t3 and a sub-phase (B) from t3-t4, and a final condition from t4 to t5.

The ordinate for plot 1102 indicates wheel torque that increases from bottom to top, although specific numerical values are not indicated. The ordinate for plot 1104 indicates a position of the dog clutch (i.e., “Locked” and “Unlocked”). The ordinate for plot 1106 indicates traction motor speed that increases from bottom to top, although specific numerical values are not indicated. The ordinate for plots 1108, 1110, and 1112 indicates torques that correspond to the traction motor, the dog clutch, and the friction clutch, respectively. The torques generally increase from bottom to top, although specific numerical values are not indicated aside from a zero value.

From t0 to t1, the electric transmission is in state iii (i.e., the second gear state). Thus, the initial condition of the downshift is a condition where the second gear is engaged via the friction clutch and the dog clutch is unlocked. In a first phase from t1 to t2, referred to as a speed phase, in the sub-phase (A) electric motor torque is increased while maintaining the friction clutch at the equivalent of drive torque and the electric motor is controlled to the first gear speed. Next, in sub-phase (B) the dog clutch transitions from an unlocked state to a locked state.

From, t3-t4, the second phase occurs which is referred to as a torque phase. In the torque phase, torque from the friction clutch is reduced to zero so that all of the torque is carried on the dog clutch. Further, in the torque phase wheel torque increases according to the ratio step. During a final condition from t4 to t5, the friction clutch is open and the dog clutch is locked. It will be appreciated that there is no motor torque compensation in the downshifting strategy depicted in FIG. 11.

FIGS. 1-11 provide for a method for operation of a transmission such as any of the transmissions described above or combinations of the transmissions. The method includes operating an electromechanically or hydraulically actuated friction clutch and a dog clutch to apply overrun torque to a first freewheeling gear. Overrun of the first gear causes the friction clutch disengagement device to passively inhibit actuation of the electromechanically or hydraulically actuated friction clutch in response to the overrun of the first gear. The method may further comprise, during a shifting transient from the second gear to the first gear, controlling the friction clutch to ensure positive torque is transmitted through the friction clutch until all of the torque is transmitted through the dog clutch.

FIGS. 5-9 are drawn approximately to scale aside from the schematically depicted components. However, the components may have other relative dimensions in alternate embodiments.

FIGS. 1-9 shows example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Additionally, elements co-axial with one another may be referred to as such, in one example. Further, elements shown intersecting one another may be referred to as intersecting elements or intersecting one another, in at least one example. Further still, an element shown within another element or shown outside of another element may be referred as such, in one example. In other examples, elements offset from one another may be referred to as such.

The invention will be further described in the following paragraphs a transmission system is provided that comprises an engagement device configured to selectively engage a first freewheeling gear that is rotationally coupled to a first gear; an electromechanically or hydraulically actuated friction clutch configured to selectively engage a second freewheeling gear that is rotationally coupled a second gear; and a friction clutch disengagement device configured to inhibit actuation of the electromechanically or hydraulically actuated friction clutch in response to an application of overrun torque to the first freewheeling gear. In one example, the friction clutch may be hydraulically actuated and the friction clutch disengagement device is a dump valve that directs fluid away from a hydraulic actuator of the hydraulically actuated friction clutch in response to overrun of the first freewheeling gear. In another example, the dump valve may be an axially actuated dump valve that is activated via the application of overrun torque to the first freewheeling gear; and the first gear may be configured to create thrust load; a spring may be positioned between a body of the first gear and shaft retains the dump valve closed when not in overrun. In another example, the dump valve may be a rotationally actuated dump valve that is incorporated into an engagement hub of the engagement device that is activated through the overrun torque in first gear. In another example, the engagement device and the hydraulically actuated friction clutch may be positioned coaxial to an intermediate shaft. In another example, the engagement device and the hydraulically actuated friction clutch may be positioned coaxial to different shafts. In another example, the friction clutch may be electromechanically actuated and the friction clutch disengagement device is an electric switch that is configured to interrupt a control command that sent to an electronic actuator of the electromechanically actuated friction clutch to induce friction clutch disengagement. In another example, the electric switch may be connected in series with the electronic actuator; or the electric switch may be configured to short circuit the electronic actuator. In another example, the electronic actuator may be axially actuated; and the first gear may be a helically cut gear. In one example, the electronic actuator may be rotationally actuated and is incorporated into an engagement hub of the engagement device. In another example, the transmission system may be included in an all-electric powertrain.

In another aspect, a method for operation of a transmission system is provided that comprises operating an electromechanically or hydraulically actuated friction clutch and a dog clutch to induce an application overrun torque to a first freewheeling gear; wherein a friction clutch disengagement device inhibits actuation of the electromechanically or hydraulically actuated friction clutch in response to the application of overrun torque to the first freewheeling gear; and wherein the transmission system includes: the dog clutch that is configured to selectively engage the first freewheeling gear that meshes with a first gear; the electromechanically or hydraulically actuated friction clutch that is configured to selectively engage a second freewheeling gear that meshes with a second gear; and the friction clutch disengagement device. In one example, the electromechanically or hydraulically actuated friction clutch and the dog clutch may be positioned coaxial to one another. In another example, the friction clutch disengagement device may be: a dump valve; or an electric switch. In another example, the electric switch may be connected in series with an electronic actuator for the electromechanically actuated friction clutch. In another example, the friction clutch disengagement device may be: axially actuated; or rotationally actuated.

In another aspect, a two-speed transmission system is provided that comprises a dog clutch configured to selectively engage a first freewheeling gear that meshes with a first gear; an electromechanically or hydraulically actuated friction clutch configured to selectively engage a second freewheeling gear that meshes with a second gear; and a friction clutch disengagement device configured to inhibit actuation of the electromechanically or hydraulically actuated friction clutch in response to an application of overrun torque to the first freewheeling gear. In one example, the electromechanically or hydraulically actuated friction clutch may be hydraulically actuated and the friction clutch disengagement device is a dump valve that directs fluid away from a hydraulic actuator of the friction clutch in response to overrun of the first freewheeling gear; the dog clutch and the electromechanically or hydraulically actuated friction clutch may be positioned coaxial to an intermediate shaft; and the dump valve may be axially actuated. In another example, the friction clutch may be electromechanically actuated and the friction clutch disengagement device is an electric switch that is configured to interrupt a control signal that sent to an electronic actuator of the electromechanically actuated friction clutch to induce clutch engagement; the electric switch may be connected in series with the electronic actuator or the electric switch is configured to short circuit the electronic actuator; and the electric switch may be axially actuated or rotationally actuated. In another example, the dog clutch and the electromechanically actuated friction clutch may be positioned coaxial to different shafts.

While various embodiments have been described above, it should be understood that they have been presented by way of example, and not limitation. It will be apparent to persons skilled in the relevant arts that the disclosed subject matter may be embodied in other specific forms without departing from the spirit of the subject matter. The embodiments described above are therefore to be considered in all respects as illustrative, not restrictive. As such, the configurations and routines disclosed herein are exemplary in nature, and that these specific examples are not to be considered in a limiting sense, because numerous variations are possible. For example, the above technology can be applied to a variety of systems that include electric drives with different types of propulsion sources including internal combustion engines, in a hybrid vehicle example. The subject matter of the present disclosure includes all novel and non-obvious combinations and sub-combinations of the various systems and configurations, and other features, functions, and/or properties disclosed herein.

Note that the example control and estimation routines included herein can be used with various transmissions and/or system (e.g., powertrain system) configurations. The control methods and routines disclosed herein may be stored as executable instructions in non-transitory memory and may be carried out by the control system including the controller in combination with the various sensors, actuators, and other electric drive and/or system hardware in combination with the electronic controller. As such, the described actions, operations, and/or functions may graphically represent code to be programmed into non-transitory memory of the computer readable storage medium in the electric transmission and/or the system. The various actions, operations, and/or functions illustrated may be performed in the sequence illustrated, in parallel, or in some cases omitted. Likewise, the order of processing is not necessarily required to achieve the features and advantages of the examples described herein, but is provided for ease of illustration and description. One or more of the illustrated actions, operations and/or functions may be repeatedly performed depending on the particular strategy being used. One or more of the method steps described herein may be omitted if desired.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A transmission system, comprising:
- an engagement device configured to selectively engage a first freewheeling gear that is rotationally coupled to a first gear;
- an electromechanically or hydraulically actuated friction clutch configured to selectively engage a second freewheeling gear that is rotationally coupled a second gear; and
- a friction clutch disengagement device configured to inhibit actuation of the electromechanically or hydraulically actuated friction clutch in response to the engagement device transferring an overrun torque to the first freewheeling gear, wherein the overrun torque is caused by an operating state of the transmission system;
- wherein the friction clutch is electromechanically actuated and the friction clutch disengagement device is an electric switch that is configured to interrupt a control command that sent to an electronic actuator of the electromechanically actuated friction clutch to induce friction clutch disengagement.

2. The transmission system of claim 1, wherein:
- the electric switch is connected in series with the electronic actuator; or
- the electric switch is configured to short circuit the electronic actuator.

3. The transmission system of claim 1, wherein:
- the electronic actuator is axially actuated; and
- the first gear is a helically cut gear.

4. The transmission system of claim 1, wherein the electronic actuator is rotationally actuated and is incorporated into an engagement hub of the engagement device.

5. The transmission system of claim 1, wherein the transmission system is included in an all-electric powertrain.

6. A method for operation of a transmission system, comprising:
- operating an electromechanically or hydraulically actuated friction clutch and a dog clutch;
- wherein a friction clutch disengagement device inhibits actuation of the electromechanically or hydraulically actuated friction clutch in response to the dog clutch transferring overrun torque to the first freewheeling gear, wherein the overrun torque is caused by an operating state of the transmission system; and
- wherein the transmission system includes:
  - the dog clutch that is configured to selectively engage the first freewheeling gear that meshes with a first gear;
  - the electromechanically or hydraulically actuated friction clutch that is configured to selectively engage a second freewheeling gear that meshes with a second gear; and
  - the friction clutch disengagement device;
  - wherein the friction clutch disengagement device is:
    - an electric switch that is configured to interrupt a control command that sent to an electronic actuator of the electromechanically actuated friction clutch to induce friction clutch disengagement.

7. The method of claim 6, wherein the electromechanically or hydraulically actuated friction clutch and the dog clutch are positioned coaxial to one another.

8. The method of claim 6, wherein the electric switch is connected in series with an electronic actuator for the electromechanically actuated friction clutch.

9. A two-speed transmission system, comprising:
- a dog clutch configured to selectively engage a first freewheeling gear that meshes with a first gear;
- an electromechanically or hydraulically actuated friction clutch configured to selectively engage a second freewheeling gear that meshes with a second gear; and
- a friction clutch disengagement device configured to inhibit actuation of the electromechanically or hydraulically actuated friction clutch in response to the dog clutch transferring overrun torque to the first freewheeling gear, wherein the overrun torque is caused by an operating state of the transmission system;
- wherein:
  - the electromechanically or hydraulically actuated friction clutch is hydraulically actuated and the friction clutch disengagement device is a dump valve that directs fluid away from a hydraulic actuator of the friction clutch in response to overrun of the first freewheeling gear;

the dog clutch and the electromechanically or hydraulically actuated friction clutch are positioned coaxial to an intermediate shaft; and the dump valve is axially actuated.

* * * * *